United States Patent [19]

Langmead

[11] 4,423,899

[45] Jan. 3, 1984

[54] SYSTEM FOR EXTENDING THE CAPACITY OF A PICK-UP TRUCK AND THE LIKE

[76] Inventor: David L. Langmead, 615 Winans Way, Baltimore, Md. 21229

[21] Appl. No.: 282,040

[22] Filed: Jul. 10, 1981

[51] Int. Cl.³ .............................................. B60P 3/00
[52] U.S. Cl. ........................................ 296/3; 211/182
[58] Field of Search ................. 296/3, 43, 32, 34, 36; 224/310, 320; 211/182, 189; 403/49, 192, 230, 231

[56] References Cited

U.S. PATENT DOCUMENTS

| | | | |
|---|---|---|---|
| 2,720,414 | 10/1955 | Hart | 296/3 |
| 2,947,566 | 8/1960 | Tower | 296/3 |
| 3,217,449 | 11/1965 | Levere | 211/182 |
| 3,329,324 | 7/1967 | Fuller | 296/3 |
| 3,589,576 | 6/1971 | Rinkle et al. | 296/3 |
| 3,973,854 | 8/1976 | Gilbo et al. | 403/231 |
| 4,138,046 | 2/1979 | DeFreze | 296/3 |
| 4,211,448 | 7/1980 | Weston | 296/3 |

FOREIGN PATENT DOCUMENTS

| | | | |
|---|---|---|---|
| 6707522 | 12/1968 | Netherlands | 211/182 |
| 565535 | 8/1975 | Switzerland | 211/189 |

Primary Examiner—Joseph F. Peters, Jr.
Assistant Examiner—Ross Weaver
Attorney, Agent, or Firm—John F. McClellan, Sr.

[57] ABSTRACT

A substantially total-needs rack system for extending the uses and the capacity of pick-up trucks provides a basic frame for rigid securance to the cargo area of a pick-up truck body with a matching assemblage of components and accessories that can selectively be installed on the basic frame through use of quick-attach/detach pins; some of the assemblage co-act together, others are usable only singly; among special cargoes that can be carried are panels, ladders, general elongate shape cargo, miscellaneous small items, and lengths of pipe which can be secured in racks by padlocks to prevent loss.

10 Claims, 9 Drawing Figures

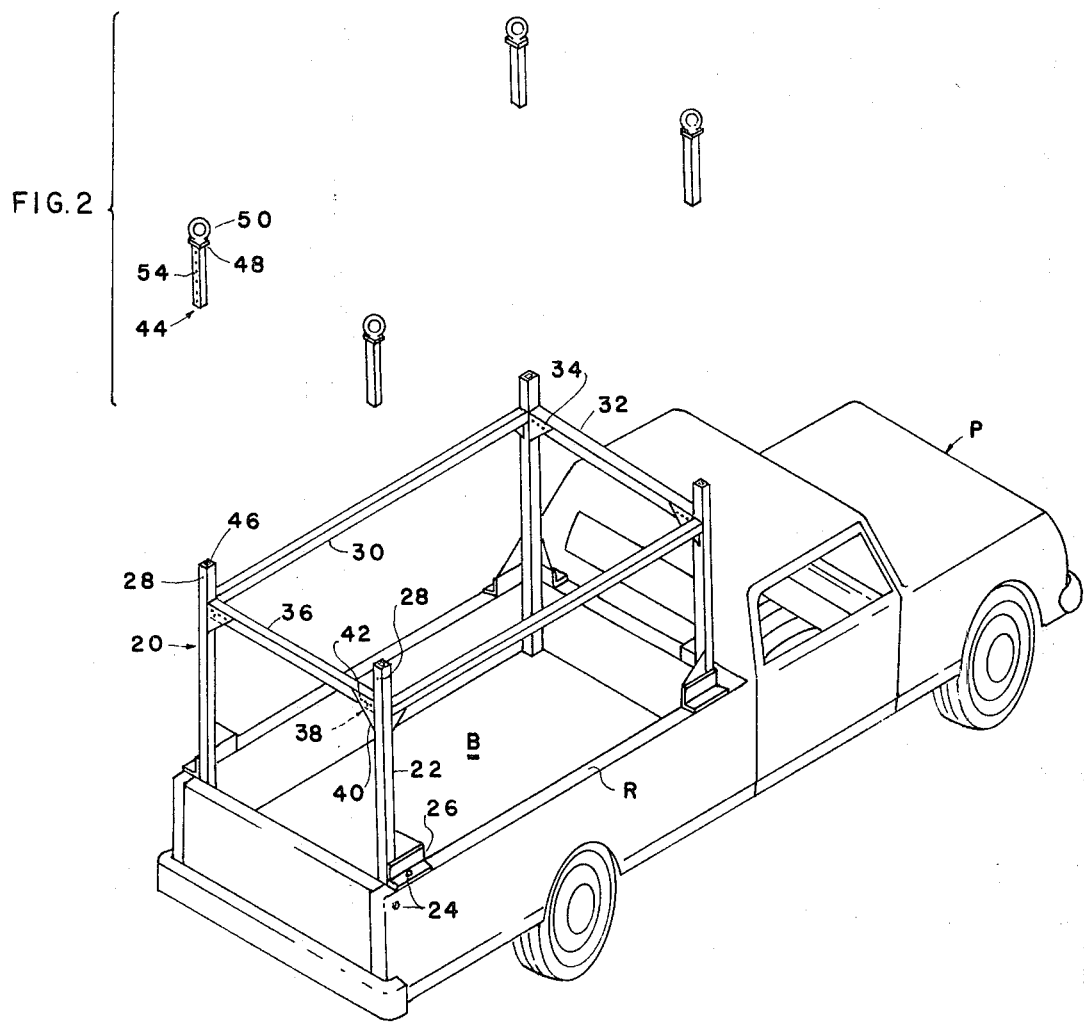

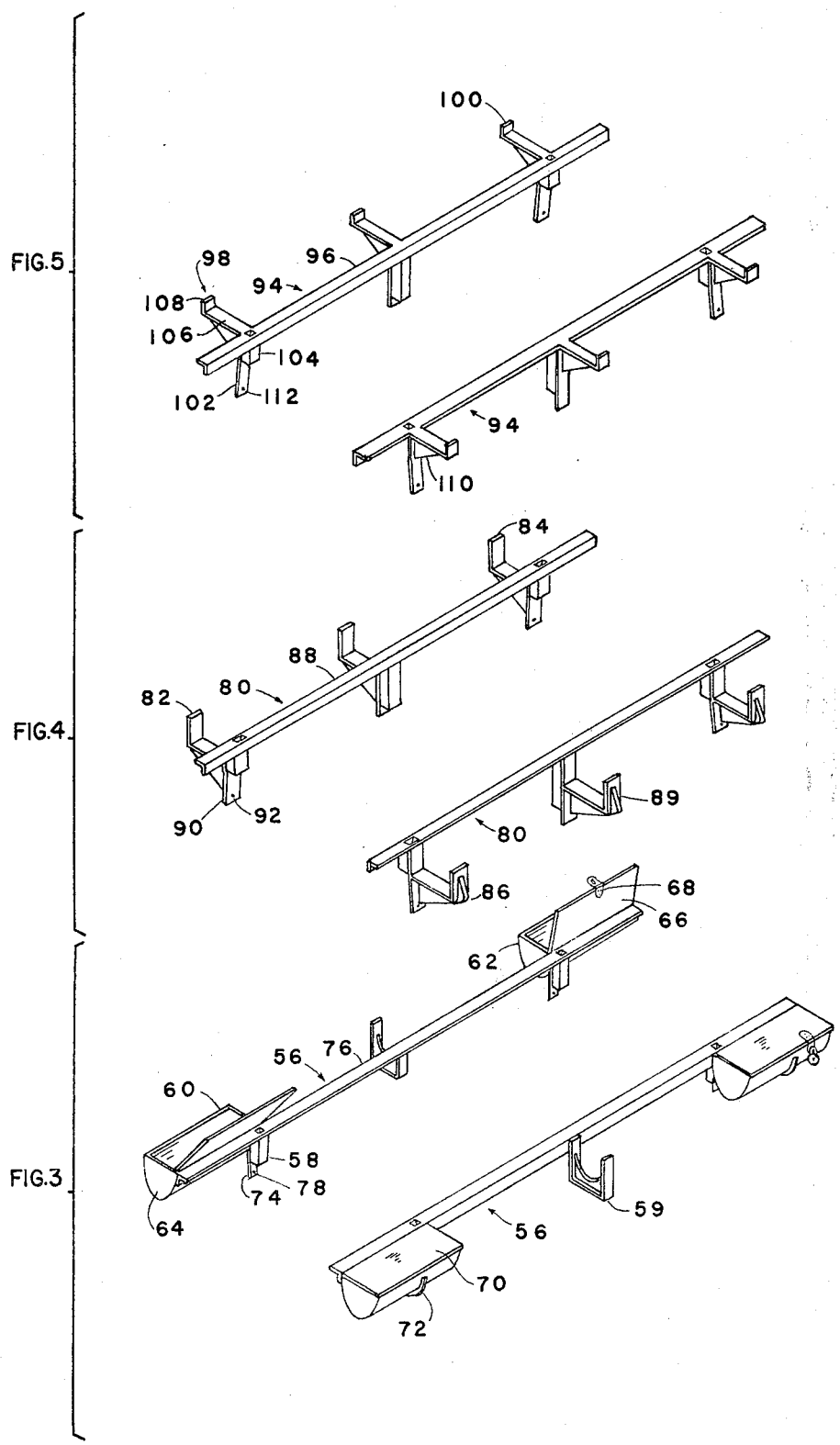

SYSTEM FOR EXTENDING THE CAPACITY OF A PICK-UP TRUCK AND THE LIKE

FIELD OF THE INVENTION

This invention relates generally to vehicles and specifically to a system for adapting a load carrier for carrying various additional specific types of loads.

BACKGROUND OF THE INVENTION

Special bodies for open trucks suited for carrying particular loads such as pipe, ladders, sheets of building material and the like have been known. Some of these have been attachable like the conventional stake body by insertion of lower parts into sockets provided for the purpose in some types of truck bodies.

OBJECTS OF THE INVENTION

Principle objects of the invention are to provide a substantially total-needs rack system, for pick-up trucks, consisting of a basic frame of universal dimension, (universal frame) rigidly secured to the truck cargo area, with an assortment of components and accessories attaching thereto either solely or in combination with other components in a prescribed manner.

Further objects are to provide a system as described to accommodate almost every trade and material handling need promoting fuel economy combined with optimum ultimate use of vehicle through light weight and interchangeability of components of the rack system, to provide such a system which avoids unnecessary obstructions in vehicle load area, and which enables fleet owners to fit trucks with a universal frame and to buy only those components needed and use same without modifications; this concept will enable different companies, or friends, to share components and save money.

Still further objects are to provide a system as described which is safe and secure in location and operation, which is easy to install and to use, without tools other than bolt-handling wrenches, and which is adaptable to fit most open body trucks although primarily intended for use with pickup trucks.

Yet further objects are to provide a system as described which is durable and compact, which is easy to knockdown, and which requires very little space for storage when part or all of the system is to be stored.

OVERVIEW OF INVENTION

The invention will be briefly described in reference to a pickup truck but it will be understood that it is not limited to pickup trucks.

A reinforced universal or basic frame of tubular aluminum construction with removeable rear crosspiece is rigidly fastened as by bolting of the lower parts to the inside perimeter of a pickup truck, (long bed model, for example) with angles, welded to frame, bearing on the truck bed. The four vertical posts of the basic frame are upright square tubes spaced uniformly apart typically at the corners of the pickup truck open bed, and permit a tubular section component pins of like material but smaller dimension to slip down into each of the posts a distance limited by a flange on each component pin. These components pins perform the key function of attaching components to the basic frame and to each other.

All primary components have sleeves of the larger tubular material as in integral part of the design, spaced exactly according to the intended placement. On attachment the components are held in position while respective component pins are slipped through the sleeves down into frame, thereby securing the components in place.

Each component pin can be further secured by a supplementary bolt passed through the basic frame and component pin.

Secondary components will incorporate the same sleeve and pin principle; however, these will either attach to an individual component itself and/or the frame except for the special front-bumper attach-ment described later.

Components will easily be made theft proof by replacing one or more supplementary bolts in the component pin with long-shackled locks.

DEFINITIONS

Universal frame—The basic frame of uniform dimensions, that is fastened to all trucks using this system, and to which all components and accessories attach or connect.

Component pins—The four separate sections of tube which pass through the sleeves of components down into the basic frame side or vertical posts thereby comprising means of attachment.

Removable rear crosspiece—Straight section of basic frame at upper rear, that can be removed when span components (defined below) are in place, or for extra height clearance of tall objects when loading.

Primary component—A part of this rack system which is attached (in a specified manner) directly to the basic frame, either solely or "ganged" with other primary components.

Secondary component—A part of this rack system which is attached (in a specified manner) to one or more primary components or to the vehicle itself, and requires a particular primary component to be in place for use, thereby expanding the use of the primary component.

Side component—Type of force-and-aft component that attaches to two basic frame vertical posts on the same side thereby leaving the component having outboard a side of the basic frame.

Top component—Attachment to basic frame that straddles two or more vertical posts over the top of the basic frame, thereby spanning the width of the basic frame.

Extension components—Components that extend the overall capability or dimension of the particular component, usually forward.

Ganging of components—To use two or three primary components, in a prescribed manner, one atop the other, in which case each component pin passes through the two sleeves down into the basic frame.

Accessory—Any hardware, device or object attached to truck, basic frame, primary or secondary component that aids system efficiency, safety or appearance.

BRIEF SUMMARY OF THE INVENTION

In brief summary given as cursive description only and not as limitation, the invention includes specialized load supporting means in the form of a pickup truck-body-mounted primary structure with a plurality of specialized secondary structures engageable with it, alone or in combination with each other, for carrying particular types of cargo at particular levels, including a level above a pickup truck cab.

BRIEF DESCRIPTION OF THE DRAWINGS

FIG. 1 is a perspective view of a vehicle with the basic frame of the invention in the bed thereof;

FIG. 2 is a perspective view of component pins which affix components onto the basic frame either directly or through other components; shown on a larger scale than FIG. 1.

FIG. 3 is a perspective view of pipe rack side component provisions;

FIG. 4 is a perspective view of general stock side component provisions;

FIG. 5 is a perspective view of ladder-rack side component provisions;

DETAILED DESCRIPTION OF THE DRAWINGS

Figure 8:
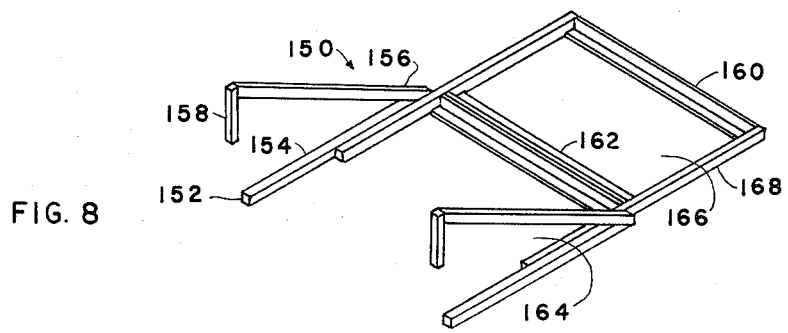
FIG. 8 is a perspective view of short front extension provisions.

FIG. 1 shows a pickup truck P of a type made by Datsun, Toyota and Mazda and known as the "long bed" type; all dimensions of the rectangular plan of the bed B are practically the same among these manufacturers.

UNIVERSAL FRAME OR BASIC FRAME

Installed in the open bed is a standard-dimension basic frame 20. This is substantially an open rectilinear framework made of square tubing. It makes a universal fit with all other parts of the invention, some of them together in combination; some separately.

Installation is by means of fit of the four vertical rectangular tubes or posts 22 in respective corners of the bed by bolts 24 run through the bed, fixing each vertical tube to it; and by gusseted lengths of angle 26 welded at right angles to the vertical tubes, which transfer vertical loads to the rim R of the bed.

Each vertical tube has holes 28 therethrough on a horizontal plane 1 inch (2.3 cm) down from the top. These are to receive bolts fixing in place component pins, to be described later.

A respective horizontal sidepiece 30 is welded between each vertical tube on the right side and on the left side of the basic frame at a position leaving a portion of each vertical tube protruding two inches (5 cm) above it. These first and second sides are united at the front by a front crosspiece 32 which has at each end a downward triangular gusset 34 with a plurality of holes matching those of a similar gusset welded in inward orientation on each vertical tube near the top. Bolts through the holes make a secure but detachable junction.

The two sides are detachably joined at the same level at the rear by a rear crosspiece 36 which fits between the vertical tubes and is held by a socket 38 on each.

Each socket is formed of an angle welded to the vertical tube with one leg horizontal as a floor of the socket and bounded on each side by a triangular gusset 40 welded in place and extending above the horizontal leg of the angle.

Two bolts 42 extending through the gussets and rear crosspiece at each end secure the rear crosspiece detachably so that it can be quickly removed for higher loading clearance when desired. To store the basic frame flat, both front and rear crosspieces can be removed.

During normal operations the rear crosspiece is kept in place to stabilize the span of the basic frame at all times except when another span component (described below) is in place. The rear crosspiece may have a "Teflon" upper surface to reduce friction in passing material over it.

The vertical tubes or posts 22 project above the sides and crosspieces to provide clearance for attachment of other components, discussed later.

Advantages of the basic frame are that it permits substantially full use of the truck bed and any tool box compartments, affords many versatile carrying provisions by itself and in conjunction with various other components and accessories to be described, and with additional ones such as screen guards for cabs, plank side attachments for appearance, and more.

COMPONENT PINS

FIG. 2 shows the square-section tubing component pins 44, the key to operation of this invention, in exaggerated relation to FIG. 1. These are quick-attachment means for detachably affixing various load supporting means to the basic frame. The component pins are small enough in cross-section to make a telescoping fit in the vertical tubes at openings 46, limited in vertical travel by a cap 48 on the top of each component pin, sized to cover the upper end of the vertical tubes. On each cap is an integral tie-down ring 50 or "U" ring.

When not in use connecting components or accessories of this system to the basic frame, the component pins 44 may be stored in the open upper ends of respective vertical tubes (22, FIG. 1). FIG. 2 is on a larger scale than FIG. 1.

When in use, the component pins 44, which have an effective length of 14 inches (35 cm) will, as will be seen, pass through the four-inch (10 cm) long sleeves of two primary components and the two inch (5 cm) long sleeve of one secondary component, to be held to the basic frame, and still engage a four inch depth of vertical tube (22, FIG. 1).

The component pins are pre-drilled at two-inch (5 cm) intevals beginning 1 inch (2.5 cm) below the cap and the vertical tubes have the matching holes (at 28, FIG. 1) previously described. It will be appreciated that the proportions are important, dimensions being given as examples.

PIPE RACK SIDE COMPONENTS

FIG. 3 shows two pipe rack side components 56, typically a pair of elements elongate in a longitudinal direction relative to the basic frame.

They fit the basic frame one on each side, and are held to it in parallel spacing by the component pins which pass through the respective four inch (5 cm) long vertical sleeves 58 located at each end of each pipe rack and down into the vertical tubes (22, FIG. 1). These sleeves are of the identical tubing used for the basic frame.

These pipe racks 56 are designed to hold standard 10 foot (3 m) lengths of pipe stock and to concentrate it at the bottom of the opposed half-round hangers or troughs 60, 62, spaced apart by 2 inch (5 cm) angle with one angle leg at the top and turned inward. Each arcuate trough has a closed outer end 64. Each far end (or each near end) trough may have a hinged cover 66 for loading and unloading stock, and a hasp 68 for padlocking to prevent theft. The other two troughs may have fixed covers.

A reinforced "U"-shaped rib 72 stiffens and strengthens each trough, to which it and the sleeves are welded as a unit.

A strap 74 below the vertical leg of angle 76 between the trough and the sleeve extends down a distance below the trough and has near the lower end a threaded hole 78. The holes accommodate bolts to press against the vertical posts and stand the elements away from the frame to prevent damage if the frame were to be fully enclosed.

Either pipe rack can be mounted on either outboard side of the basic frame. The sleeves 58 are substantially equal in height with the troughs.

A bracket 59, or central hanger, of similar sectional shape to the troughs, supports the middle of pipe being hauled. As will be seen, the bracket bears laterally inboard to the frame for support under load. This is typical of all such elements in the system.

GENERAL STOCK SIDE COMPONENTS

FIG. 4 shows two general-stock side components 80. These are laterally extending horizontal members with upturns at the lateral ends thereof, in many ways similar in construction to the pipe rack components except that the troughs or brackets 82, 84 are shorter, 2 inches (5 cm) long, are open at both ends, and are generally square-"U" shaped and have no covers. Each has a reinforcing "L" shaped flange 86 similarly located around the trough at each sleeve, and a similarly disposed angle 88 in welded assembly. A similar-section middle element 89 is suppled as a support for the middle of stock carried.

A similar strap 90 with hole 92 is similarly located and attached for the purpose noted, on each stock carrying element. The upturns at the outboard ends are sufficiently great to hold general stock such as 2×4's and the like in quantities usually carried.

LADDER RACK SIDE COMPONENTS

FIG. 5 shows two ladder rack side components 94. These are similar in construction to the general stock side components in spacing and mounting in pairs of holders by an angle 96 in welded assembly. However, each holders 98, 100, is a two inch (5 cm) wide strap bent into an angle with upright 102 welded to a respective sleeve 104 and with a horizontal length 106 extending outboard from the upright at the level of the top of the sleeve 104 and then turning up at the end 108 a distance preventing common extension-type ladders and stepladders hung on the horizontal length 106 from sliding off. Underneath, a reinforcing triangular gusset 110 extends between the upright and the horizontal protions. Each upright extends downward a distance providing a bearing for the lower rail of a ladder hung on it and may have a threaded hole below the sleeve for a stand-off bolt as previously described. These components represent a general advantage of similar components in the system in that they are sufficiently interchangeable to be exchanged in position for mounting on either side of the basic frame.

GUARD RAIL SECONDARY COMPONENTS

Figure 6:
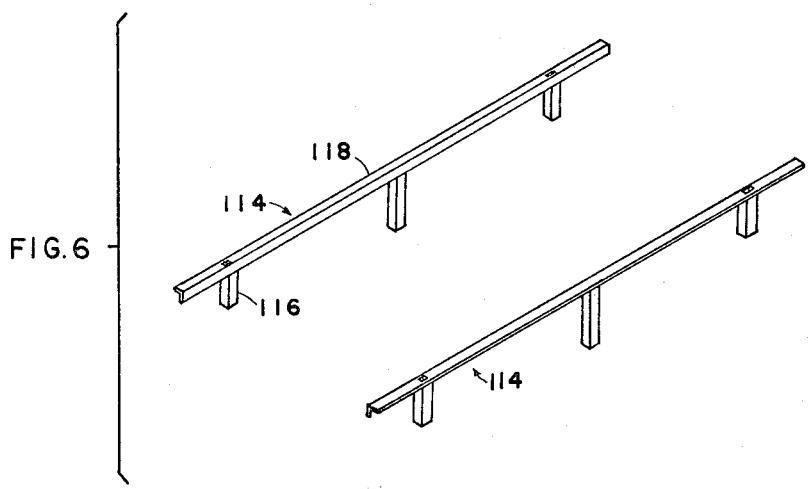
FIG. 6 is a perspective view of guard rail accessory provisions.

FIG. 6 shows the guard rail secondary component 114. These are side components with no features, comprising sleeves 116 spaced by straight lengths of angle 118 (like those of the components shown in FIGS. 3–5). However, they can serve a number of functions such as, for example, they can add extra height to fence in ladders laid on top of the basic frame, they can act as a blank side to balance appearance if only one side component is used, or they can be used for carrying signs or other advertising. They can be used on either side of the basic frame, inside or out.

The upper end of each sleeve 116 is flush with the guard rail.

GENERAL NOTES TO SIDE COMPONENTS

At this point it can be observed that many variations can be achieved by interchanging these features. For example, combinations may include pipe/ladder rack, general stock/guard rail, etc. As noted, the rear crosspiece must be secured in place when using side components alone, and only one "featured" side component may be used per side, i.e. a general stock side component or a pipe rack side component.

TOP TRAY TOP-COMPONENT

Figure 7:
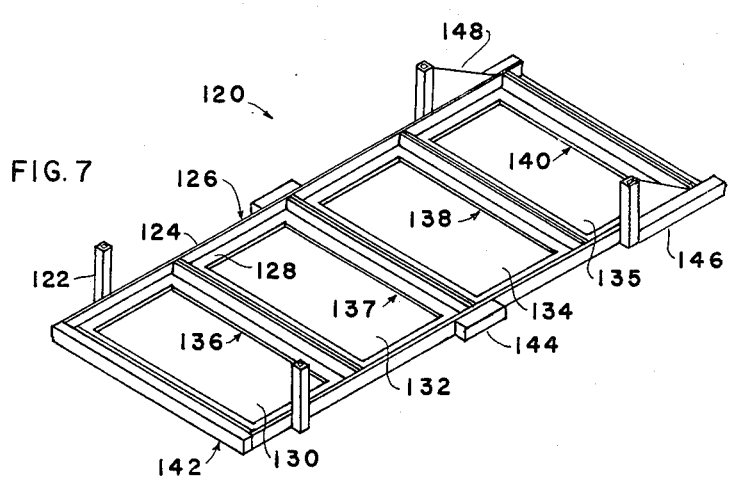
FIG. 7 is a perspective view of top tray top component provisions.

FIG. 7 shows the top tray component 120. This is next in importance to the basic frame.

The top tray component spans all four posts (22, FIG. 1) of the basic frame, one of the four inch (10 cm) long sleeves 122 which are welded flush with the bottom of the top tray aligning over each post where it is held by insertion of a respective component pin (44, FIG. 2). Therefore when the top tray is in place the rear crosspiece (36, FIG. 1) can be eliminated.

Each sleeve 122 is held flush at the bottom, projecting above the top, and in proper spacing, welded on the outboard side of the vertical leg 124 of one of a pair of parallel-spaced longitudinal angles 126 each of which angles has a leg 128 at the bottom turned inboard.

The tray area is divided into four equal smaller tray areas 130, 132, 134, 135 in which plywood can be laid, by five transverse members, four sets of transverse back-to-back angles 136, 137, 138, 140, and one tube-and-angle 142 having lower leg horizontal. The set 140 at the front also co-acts with the FRONT EXTENSIONS, described later to form additional smaller tray area.

Plywood panels can be laid in the four tray areas on the supportively oriented angles to carry smaller objects. Rear tray component angle crosspiece 142 has the horizontal leg inboard at the bottom with the tube behind and with a "Teflon" upper surface to reduce material handling friction. The tube accommodates heavy loads and presents a broad "Teflon" upper surface.

A length of tubing 144 extends longitudinally along the outboard side of the midpoint of each angle 126. These acts as bearing surfaces for side components that are "ganged" (placed atop) the top tray.

A horizontal sleeve 146 leads forward from the front two of the four component pin sleeves 122, to which it is similar in cross-section, on each outboard side at the front to a position equal with the front of the tray span component 120. These horizontal sleeves are key features of this component; they receive various extensions and attachments to further system capabilities, as will be described later under "SECONDARY COMPO- NENTS FOR THE TOP TRAY COMPONENT". Front gussets 148 may be used to reinforce the horizontal and the vertical sleeves.

The top tray component can accommodate ladders, stock, and with plywood lay-in shelves or panels, smaller objects such as cartons. A full 4×8 feet (1.2×2.4 m) plywood sheet can be carried flat with weight evenly distributed in the tray area, something many small pickup truck beds cannot do because of the wheel wells and short bed-length.

In addition, any side component can be used, one to a side of the tray area, permitting full and versatile use of the truck, and of the rack facilities among which are the following.

SECONDARY COMPONENTS FOR TOP TRAY COMPONENT FRONT EXTENSION, SHORT

FIG. 8 shows the short front-extension 150, which adds an additional 4 feet (1.2 m) of tray length, for a total of twelve feet (3.7 m).

This is a generally rectangular frame with projecting ends welded on the rear outboard sides of the side rails, and braces.

The projecting ends 152 of the two square-tube rear side rails 154 are small and insert in a telescoping fit into the two horizontal sleeves (146, FIG. 7) of the top tray component.

A similarly affixed angle brace 156 rises from each side rail in a rearwardly up-sloping direction and ends at the rear with a short (2 inch; 5 cm) vertical sleeve 158 which aligns over a vertical sleeve (122, FIG. 7) of the top tray component where it can be held by a pin component (44, FIG. 2) passed through both and into a post of the basic frame. If a side component is not being used a 4 inch (10 cm) long sleeve spacer is required at each such junction.

This front extension has a transverse front angle 160 and at an intermediate position a back-to-back pair of angles 162 for forming smaller tray areas 164, 166 as described before. The front rails 168 are closer than the rear rails 154.

Using this short front extension permits carrying longer stock and ladders, with good truck cab protection.

FRONT EXTENSION, LONG

Figure 9:
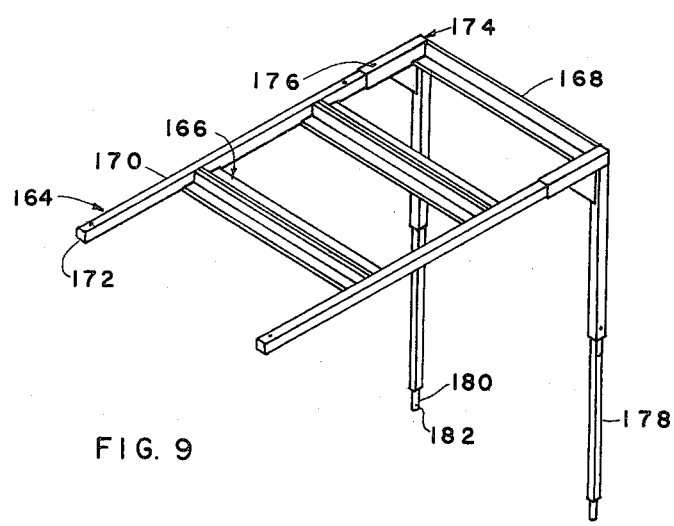
FIG. 9 is a perspective view of long front extension provisions.

FIG. 9 shows the front extension 164. Like the short front extension, it has transverse back-to-back paired angles 166, but two instead of one, a transverse front angle 168, so that three smaller tray areas are formed ahead of the top tray component instead of two, and the side rails 170 are of square tubing but have free ends 172 which in use telescope directly back into the top tray component horizontal sleeves (146, FIG. 7).

The braces are entirely different, comprising two gusseted angles 174 of tubing which makes a pin-stabilizable sliding fit in the side rails 170. The pins or bolts 176 are put in after the members telescope to desired fit with a particular vehicle. The downward portion of each gusseted angle makes a pin-stabilizable sliding fit in a vertical member 178 which has at the bottom a rod 180 with a hole 182 for fixing to a socket-type bumper attachment conventionally clamped to a front bumper.

The long front extension effectively extends the top tray to the front of the truck for accommodating extra long ladders and stock.

This invention is not to be construed as limited to the particular forms disclosed herein, since there are to be regarded as illustrative rather than restrictive. It is, therefore, to be understood that the invention may be practiced within the scope of the claims other wise than as specifically described.

What is claimed and desired to be protected by United States Letters Patent is:

1. A system for extending the capacity of a pickup truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, all said pins, sleeves and posts having substantially square cross-section, the means limiting travel including a cap on each pin, each cap having a tie-down ring thereon, and all said pins, sleeves and posts being in vertical alignment when the pins are in said sleeves and posts.

2. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from a position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting means being elongate in a longitudinal direction relative to said basic frame, said load supporting means comprising a pair of elements for affixing in laterally parallel spacing along respective sides of said basic frame by said quick attachment means, and each of said pair of elements having a middle member located for supportive contact with said basic frame.

3. A system as recited in claim 2, each said pair of elements having respective hook-shaped structure thereon in location for extending outboard of a said pickup truck bed and with proportion for carrying a said specific load, the hook-shaped structure including: a front hanger and a rear hanger, and a central hanger at said middle member between the front hanger and the rear hanger.

4. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting-means comprising a pair of elements for affixing in laterally parallel spacing along respective sides of said basic frame by said quick attachment means, each said pair of elements having respective hook-shaped structure thereon in location for extending outboard of a said pick-up truck bed and with proportion for carrying a said specific load, the hook-shaped structure including: a front hanger and a rear hanger, and a central hanger at said middle member between the front hanger and the rear hanger and a strap with a tapped hole therein extending below each said hanger for standing said hanger away from and preventing damage to any covering on the basic frame.

5. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting means being elongate in a longitudinal direction relative to said basic frame, said load supporting means comprising a pair of elements for affixing in laterally parallel spacing along respective sides of said basic frame by said quick attachment means, each said pair of elements having respective hook-shaped structure thereon in location for extending outboard of a said pickup truck bed and with proportion for carrying a said specific load, the hook-shaped structure including: a front hanger and a rear hanger, each said hanger being in the form of an arcuate trough with an end for securing pipe and the like in conjunction with another said arcuate trough, at least one of said arcuate troughs having a hinged cover thereon, and means for locking said hinged cover.

6. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from a position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting means being elongate in a longitudinal direction relative to said basic frame, said load supporting means comprising a pair of elements for affixing in laterally parallel spacing along respective sides of said basic frame by said quick attachment means, said pair of elements being guard rails comprising a pair of straight lengths of angle with said sleeves attached thereto, said sleeves being therebeneath and downwardly protruding, each said guard rail having openings downwardly at a plurality of said sleeves for passage of pins into the sleeves.

7. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from position at a respective corner of a said open bed to a point higher than a said cab of a pick-up truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting means being a top tray component spanning all four of said posts, a plurality of transverse members dividing the top tray component into tray areas, and said transverse members including angles oriented for supporting panels in said tray areas.

8. A system as recited in claim 7, a rearmost of said transverse members including a tubular crosspiece having a "Teflon" coating for reducing friction of material handling.

9. A system as recited in claim 7, said top tray component having a pair of parallel-spaced longitudinal angles forming sides thereof, said top tray component having a length of tubing extending horizontally along the outboard central portion of each said parallel-spaced longitudinal angle in position to support portions of any components placed thereabove.

10. A system for extending the capacity of a pick-up truck and the like having an open bed with upright sides for carrying particular loads at levels including a level above the cab of a said pick-up truck comprising: a basic frame for affixing inside a said open bed, means fixing the basic frame to a said open bed, load-supporting means proportioned for use with the basic frame for supporting loads specific to certain trades in spaced relation with a said open bed, quick-attachment means for detachably affixing said load supporting means to said basic frame, the basic frame including four posts, each said post having tubular shape and length for extending upright from position at a respective corner of a said open bed to a point higher than a said cab of a pickup truck, means for holding each post upright in said position, the load supporting means having a plurality of vertical sleeves, the quick-attachment means including a plurality of pins proportioned for extending downwardly through respective of said sleeves into said posts, means for limiting travel of said pins in said sleeves and posts, said load supporting means being a top tray component spanning all four of said posts, a forward part of each parallel-spaced longitudinal angle having a horizontal sleeve longitudinally affixed therealong, a front extension means having a rearwardly projecting end respectively supportively engageable with each said horizontal sleeve, and said front extension means having panel-support means thereon.

* * * * *